(12) United States Patent
Pucci

(10) Patent No.: US 11,346,477 B2
(45) Date of Patent: May 31, 2022

(54) QUICK COUPLING

(71) Applicant: C.MATIC S.p.A., Giussano (IT)

(72) Inventor: Flavio Pucci, Verano Brianza (IT)

(73) Assignee: C.MATIC S.p.A., Giussano (Monza (IT)

(*) Notice: Subject to any disclaimer, the term of this patent is extended or adjusted under 35 U.S.C. 154(b) by 162 days.

(21) Appl. No.: 16/916,633

(22) Filed: Jun. 30, 2020

(65) Prior Publication Data

US 2021/0003238 A1 Jan. 7, 2021

(30) Foreign Application Priority Data

Jul. 2, 2019 (IT) .......................... 102019000010731

(51) Int. Cl.
*F16L 37/22* (2006.01)
*F16L 37/084* (2006.01)
*F16L 37/42* (2006.01)

(52) U.S. Cl.
CPC .......... *F16L 37/0841* (2013.01); *F16L 37/42* (2013.01); *F16L 37/22* (2013.01)

(58) Field of Classification Search
CPC ....... F16L 37/0841; F16L 37/42; F16L 37/22; F16L 37/23; F16L 37/40; F16L 2201/20
See application file for complete search history.

(56) References Cited

U.S. PATENT DOCUMENTS

| 9,464,742 | B2* | 10/2016 | Taguchi | .................. F16L 37/23 |
| 2004/0084650 | A1* | 5/2004 | Nicolino | .................. F16L 37/42 |
| | | | | 251/149.6 |

(Continued)

FOREIGN PATENT DOCUMENTS

| CN | 104089128 A | * | 10/2014 | .............. F16L 37/23 |
| DK | 200400771 A | * | 5/2004 | .............. F16L 37/23 |

(Continued)

OTHER PUBLICATIONS

Search Report dated Mar. 3, 2020 for Italian patent application No. 102019000010731.

*Primary Examiner* — Zachary T Dragicevich
*Assistant Examiner* — James A Linford
(74) *Attorney, Agent, or Firm* — Vorys, Sater, Seymour & Pease

(57) ABSTRACT

Quick coupling including casing defining longitudinal axis, outlet and inlet, to receive at the inlet at least part of external connector to fluidity connect external connector and outlet, shutter housed within casing to translate along longitudinal axis in opposition to opposing element, housing at least part of external connector and including retainer to lock at least part of external connector within shutter in at least one position along longitudinal axis, controller accessible from outside and including first slider housed within casing to translate along locking direction skewed relative to longitudinal axis in opposition to second opposing element, to house at least part of the shutter and including lock to lock the shutter within first slider in position along locking direction, and safety to lock shutter when subjected to pressures above predetermined threshold by fluid present within coupling, wherein the shutter locks external connector at least when safety locks shutter.

9 Claims, 3 Drawing Sheets

(56) References Cited

U.S. PATENT DOCUMENTS

| | | | |
|---|---|---|---|
| 2004/0094739 A1* | 5/2004 | Lacroix | F16L 37/23 251/149.1 |
| 2004/0094956 A1 | 5/2004 | Lacroix et al. | |
| 2008/0252069 A1 | 10/2008 | Tiberghien et al. | |

FOREIGN PATENT DOCUMENTS

| | | | | |
|---|---|---|---|---|
| EP | 375581 A | * | 6/1990 | F16L 37/0841 |
| EP | 0943066 A1 | | 9/1999 | |
| EP | 1980782 A1 | * | 10/2008 | F16L 37/0841 |
| EP | 3771856 A1 | * | 2/2021 | F16L 17/025 |
| FR | 2166770 A5 | * | 8/1973 | |
| FR | 2511115 A1 | * | 2/1983 | |
| FR | 2724710 A1 | | 3/1996 | |
| WO | 9919657 A1 | | 4/1999 | |
| WO | WO-2020152832 A1 | * | 7/2020 | F16L 37/0841 |

* cited by examiner

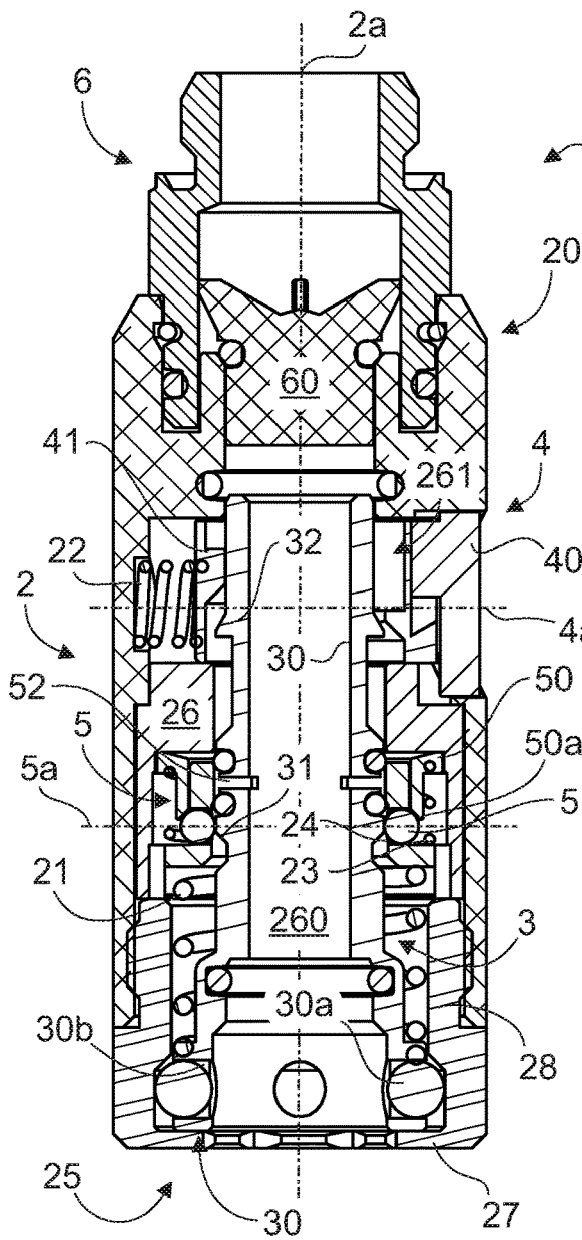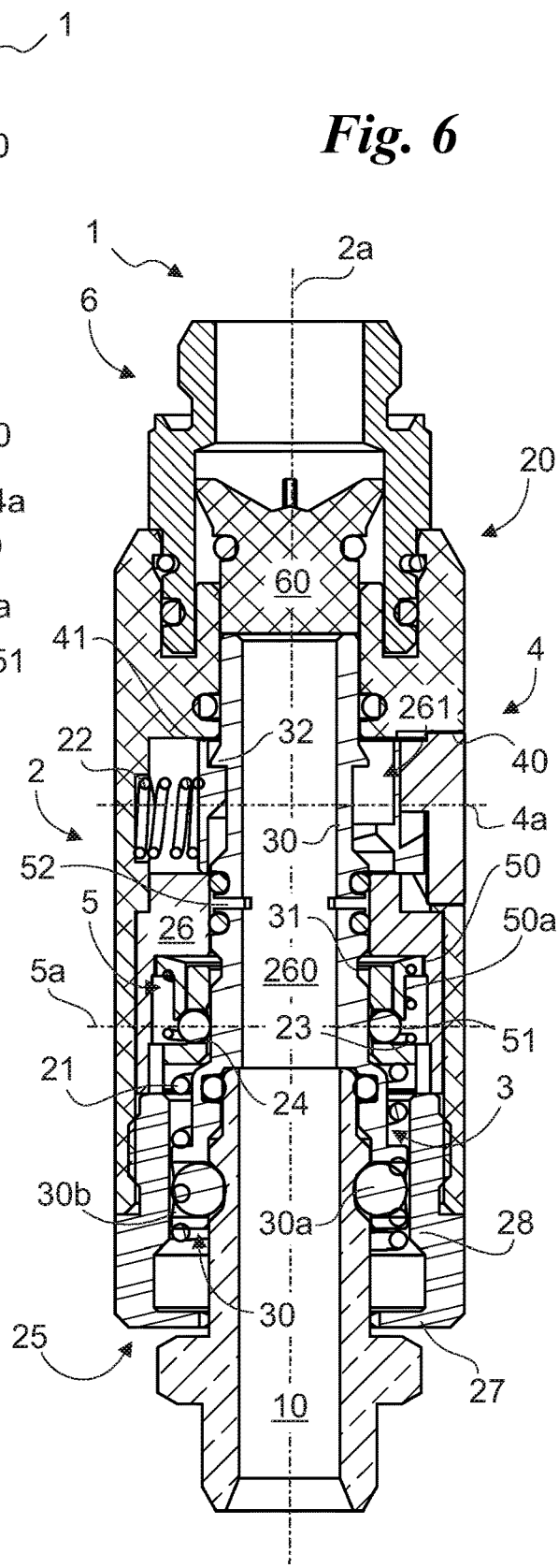
*Fig. 5*
*Fig. 6*

QUICK COUPLING

FIELD OF THE INVENTION

This invention relates to an improved quick coupling of the type comprising a casing defining a longitudinal axis, an outlet and an inlet, and configured to receive at the inlet at least part of an external connector so as to put the external connector and the outlet in fluidic through connection with each other, a shutter housed within the casing so that it can translate along the longitudinal axis in opposition to first opposing means, configured to house at least part of the external connector and including retaining means configured to lock at least part of the external connector within the shutter in at least one position along the longitudinal axis, control means accessible from the outside and including at least one first slider housed within the casing so that it can translate along a locking direction skewed with respect to the longitudinal axis in opposition to second opposing means, configured to house at least part of the shutter and including locking means configured to lock the shutter within the first slider in at least one position along the locking direction.

DESCRIPTION OF THE PRIOR ART

In particular, this invention relates to a quick coupling configured to have at least two pneumatic ducts in fluidic through connection.

As is well known, the quick couplings in the current state of the art are composed, briefly, of a coupling casing designed to receive an external connector, so as to create a male-female type coupling, and of a command button drilled and designed to house part of the external connector.

The command button can generally be operated in opposition to a spring and makes it possible to control both the locking and the release of the male connector.

The button is, in fact, configured to lock the connector inside the casing when the connector is inserted inside the female connector, and is also designed to enable a controlled release.

For this purpose, in particular, the button almost always includes two internal shoulders, longitudinally offset, designed to mechanically interfere, directly or indirectly, with part of the connector or, if present, with part of a shutter inside the casing and placed between the male connector and the outlet of the quick coupling.

The described prior art comprises some significant drawbacks.

In particular, most of the prior art couplings include a button that, in order to manufacture the shoulders that define the mechanical locks of the connector or shutter, requires very long, complicated, and expensive machining.

In most cases, the buttons have to undergo milling processes using specific machines designed to machine curved surfaces. In fact, generally, these buttons are formed beginning with almost cylindrical components drilled into the curved side surface.

In addition, from a safety point of view, the described quick couplings have the significant drawback of depending on the user's control. In fact, during the step for disconnecting the external connector, if the user presses and releases the button too quickly, the male connector may be ejected from the coupling under such pressure as to pose a significant risk to the user's health, as well as a risk to the environment in which the user is working, since uncontrolled ejection of the connector can lead to damage to the surrounding equipment.

In order to avoid this last technical problem, we have developed enhanced couplings able to control the release of the connector by applying pneumatic pressure inside the coupling.

An example of this connector is described in the patent application US-A-2004094956.

The enhanced coupling basically has a structure very similar to the conventional couplings described above; however, it includes an additional slider, arranged inside the female casing, designed to translate longitudinally due to the mechanical effect of the coupling or shutter and due to the effect of the pressure inside the coupling.

In particular, when the male connector is released, the slider translates longitudinally due to the effect of pressure and locks the button so that any hasty release by a user does not result in the uncontrolled ejection of the connector. The button, in fact, keeps the connector locked until the pressure pushes the slider into the locked position, i.e. up to a predetermined internal pressure value.

When the pressure drops below a predetermined level, the button overcomes the mechanical lock of the cursor by pushing it again. Basically, therefore, the operating principle is given by the balance between the opposing force of the spring on the button and the force exerted by the slider under pressure.

However, even the enhanced coupling has the significant drawback of requiring a button made in the conventional way, i.e. with offset shoulders and internal grooves, since the interaction between button, slider, and connector, or shutter is decisive for the coupling's operation.

In addition, the interaction surfaces of the button with the slider are elements that additionally complicate the determination of the button's internal geometry.

In addition, the coupling entirely depends on the button and, therefore, since the button is the element that the user most commonly uses, and given the interactions between button and slider, the coupling easily breaks or malfunctions following a high number of use cycles.

The continuous rubbing of the locking surfaces can lead to friction wear of the parts and, therefore, to the coupling's loss of efficiency and safety.

SUMMARY OF THE INVENTION

In this context, the technical task underlying this invention is to devise an improved quick coupling capable of substantially overcoming at least some of the above-mentioned drawbacks.

Within said technical task, one important purpose of the invention is to obtain an improved quick coupling that makes it possible to maintain high efficiency and safety even after a high number of use cycles.

Another important purpose of the invention is to create an improved quick coupling that reduces the complexity of the interaction element between coupling and user, i.e. the button, thus also reducing the costs and machining time of the button itself. The technical task and specified purposes are achieved with a quick coupling of the type comprising a casing defining a longitudinal axis, an outlet and an inlet, and configured to receive at the inlet at least part of an external connector so as to put the external connector and the outlet in fluidic through connection with each other, a shutter housed within the casing so that it can translate along the longitudinal axis in opposition to first opposing means, configured to house at least part of the external connector and including retaining means configured to lock at least part of the external connector within the shutter in at least one position along the longitudinal axis, control means accessible from the outside and including at least one first slider housed within the casing so that it can translate along a locking direction skewed with respect to the longitudinal axis in opposition to second opposing means, configured to house at least part of the shutter and including locking means configured to lock the shutter within the first slider in at least one position along the locking direction, and furthermore safety means configured to lock the shutter when subjected to pressures higher than a predetermined threshold value caused by a fluid present within said coupling, said shutter locking the external connector at least when the safety means lock said shutter.

BRIEF DESCRIPTION OF THE DRAWINGS

The characteristics and benefits of the invention will be clarified in the following detailed description of some preferred embodiments of the invention, with reference to the accompanying drawings, wherein:

FIG. 5 shows a cross-section view of an improved quick coupling according to the invention in an alternative embodiment, at rest and with the shutter withdrawn towards the inlet of the casing; and FIG. 6 illustrates a cross-section view of an improved quick coupling according to the invention in an alternative embodiment, in use, with the shutter advanced towards the outlet of the casing and the external connector locked by the shutter.

DESCRIPTION OF THE PREFERRED EMBODIMENTS

Figure 1:
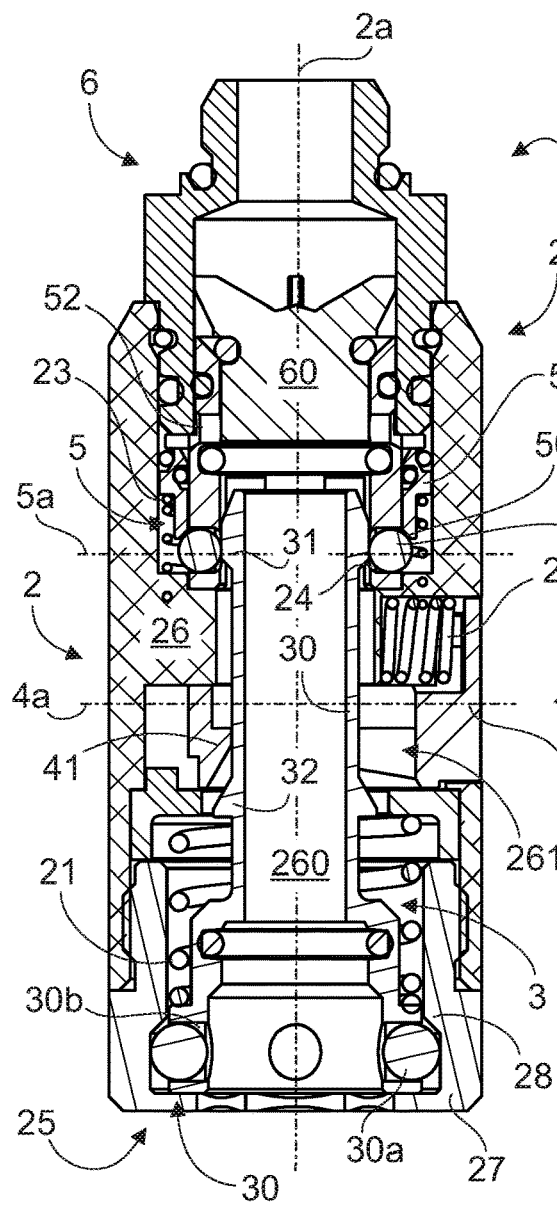
FIG. 1 shows a cross-section view of an improved quick coupling according to the invention in the preferred embodiment, at rest and with the shutter withdrawn towards the inlet of the casing.
Figure 2:
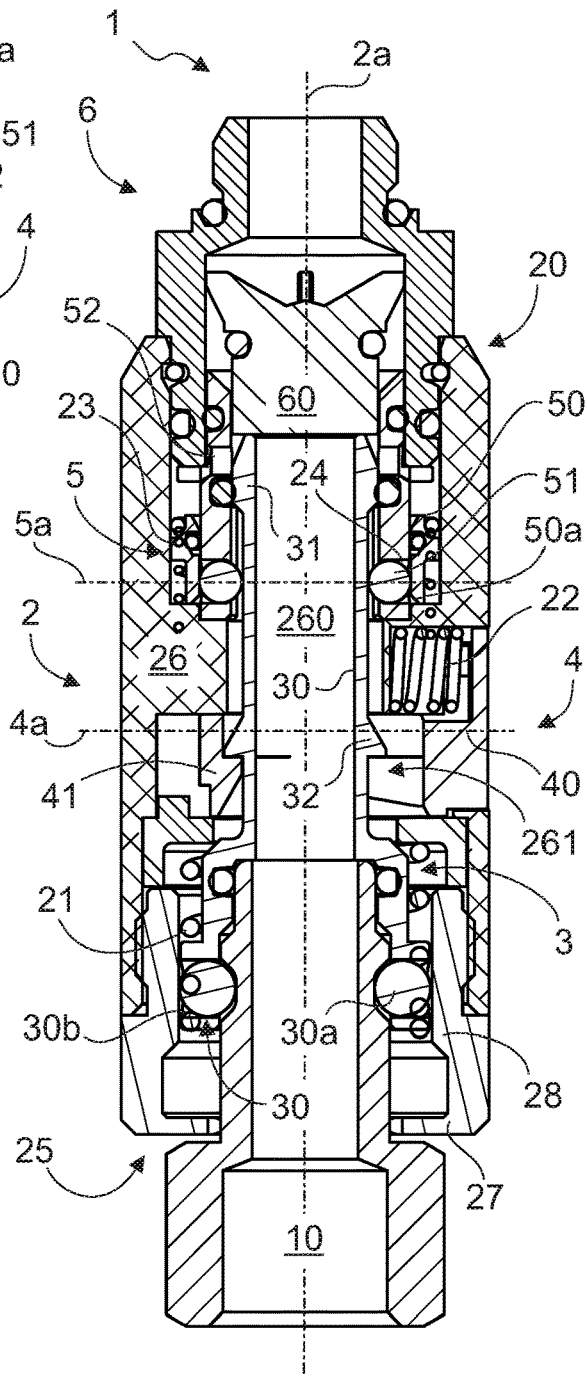
FIG. 2 illustrates a cross-section view of an improved quick coupling according to the invention in the preferred embodiment, in use, with the shutter advanced towards the outlet of the casing and the external connector locked by the shutter.
Figure 3:
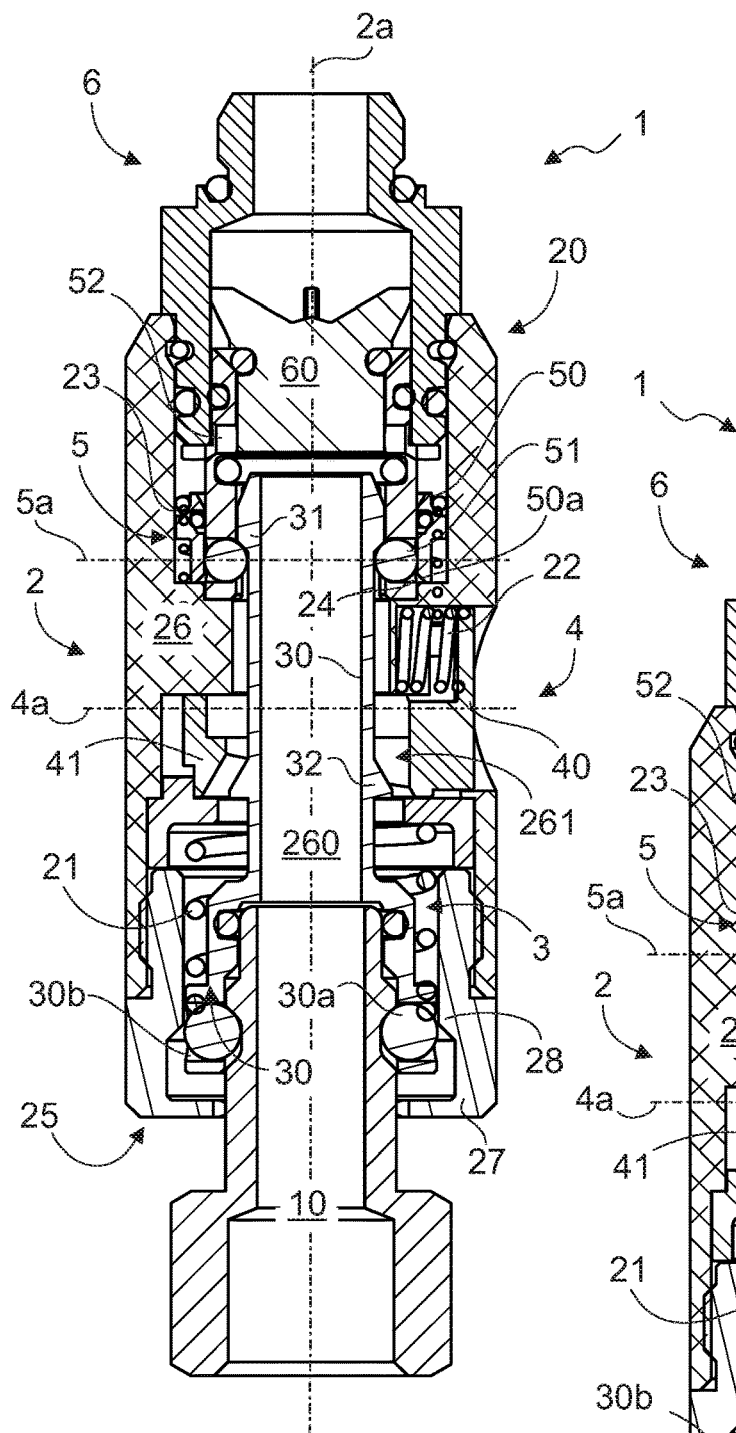
FIG. 3 is a cross-section view of an improved quick coupling according to the invention in the preferred embodiment, during activation of the control means with the shutter locked by the safety means and the external connector locked by the shutter.
Figure 4:
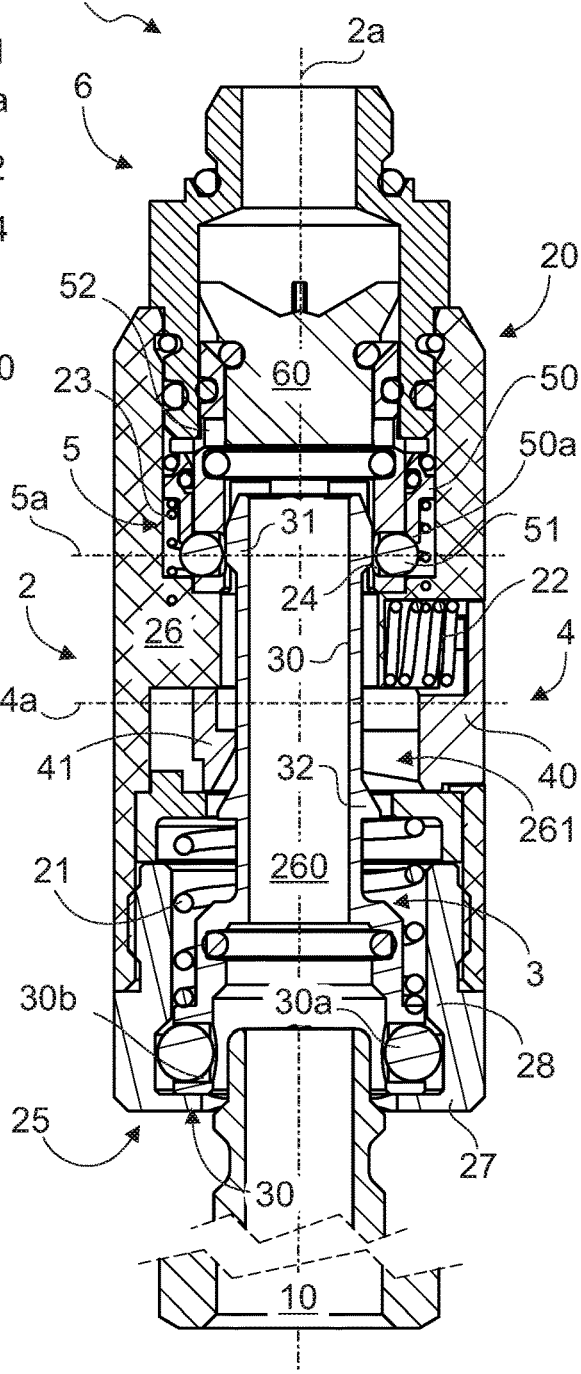
FIG. 4 represents a cross-section view of an improved quick coupling according to the invention in the preferred embodiment, in the release step with the safety means releasing the shutter and the external connector locked by the withdrawal of the shutter towards the inlet of the casing.

In this document, when measurements, values, shapes, and geometric references (such as perpendicularity and parallelism) are associated with words like "approximately" or other similar terms, such as "almost" or "substantially", they shall be understood as except for errors of measurement or imprecisions due to errors of production and/or manufacturing and, above all, except for a slight divergence from the value, measurement, shape, or geometric reference with which it is associated. For example, if associated with a value, such terms preferably indicate a divergence of no more than 10% of the value itself.

Furthermore, when used, terms, such as "first", "second", "higher", "lower", "main", and "secondary" do not necessarily identify an order, relationship priority, or relative position, but they can simply be used to distinguish different components more clearly from one another.

Unless otherwise stated, the measurements and data reported in this text shall be considered as performed in International Standard Atmosphere ICAO (ISO 2533:1975).

With reference to the figures, the reference number 1 globally denotes the improved quick coupling according to the invention.

The coupling 1 is preferably a pneumatic quick release coupling. It is, therefore, preferably designed to have at least two ducts in fluidic through connection. This connection preferably takes place quickly by means of a hooking and unhooking mechanism that enables an external connector 10 to be coupled to and removed from the coupling 1.

The external connector 10 is preferably a connector, of a known type, designed to enable the connection of a pneumatic duct with the coupling 1.

Basically, therefore, the coupling 1 and the external connector 10 create a coupling between them of the female-male type, widely known in the relevant technical field.

In particular, of course, the coupling 1 is the female part of the connection, while the external connector 10 is the male part of the connection.

The coupling 1 can, preferably, be, in turn, connected to a main connector 6.

The main connector 6 is preferably designed to connect another duct to the coupling 1. Therefore, for example, the main connector 6 connects the coupling 1 to a duct defining a line for pumping a fluid while the external connector 10 connects the coupling 1, when the connection is established, with a duct designed for a device.

For example, the main connector 6 can be operatively connected to a compressor and the coupling 1 can be designed to receive the external connector 10 in order to transfer compressed air to an external device.

Of course, the main connector 6 may also be removably attached to the coupling 1. In any case, the connector 6 is preferably part of the coupling 1.

Therefore, in a preferred, but non-exclusive, embodiment, the coupling 1 also includes the main connector 6.

In general, the coupling 1 has a structure and at least part of the internal coupling mechanism similar to the couplings in the prior art. Therefore, the majority of the concepts described below may be redundant to the person skilled in the art.

In any case, the main differences between the improved quick coupling 1 and the prior art devices are specified below.

Briefly, the coupling 1 comprises a casing 2, a shutter 3, and control means 4.

The casing 2 preferably defines the connecting portion between the main connector 6 and the external connector 10. In fact, the connectors 6, 10 are not designed to be in contact, but are placed in fluidic through connection by means of the casing 2.

The casing 2, therefore, defines at least one inlet 25 and an outlet 20.

The inlet 25 is preferably the portion of casing 2 designed to receive the external connector 10. Therefore, the external connector 10 is preferably received or inserted inside the casing 2 by means of the inlet 25.

Basically, the inlet 25 is preferably made as a hole inside of which the external connector 10 can be inserted.

In any case, the inlet 25 preferably enables the housing of the external connector 10 so as to put the external connector 10 in fluidic through connection with the outlet 20.

This connection, as described below, is preferably an indirect connection, or made, in particular, by means of the shutter 3.

The outlet 20 is, preferably, the portion of casing 2 designed to receive the main connector 6. In the preferred embodiment, the outlet 20 includes the same main connector 6, in any case, it could simply be the part of the casing 2 in contact with the main connector 6.

The outlet 20 can also, preferably, be defined by a hole inside of which the main connector 6 can be housed or in fluidic through connection with the main connector 6 itself.

The casing 2, therefore, defines a longitudinal axis 2a.

The casing 2 preferably extends mainly along the longitudinal axis 2a and is designed to receive the external connector 10 introducing the same inside the casing along the longitudinal axis 2a. Even more specifically, when inserted, the external connector 10 is preferably aligned and centred in relation to the longitudinal axis 2a.

The casing 2, in particular, comprises a central body 26.

The central body 26 is basically an almost cylindrical element designed to surround at least part of the external connector 10. In addition, the central body 26 is preferably designed to house the main connector 6.

In addition, the central body 26 is preferably configured to loosely attach the shutter 3 and the control means 4.

To this end, the central body 26 preferably defines a first guide 260 and a second guide 261.

The first guide 260 is preferably designed to loosely accommodate the shutter 3. In particular, it houses the shutter 3 so that it can move along the main axis 2a. Therefore, the first guide 260 is basically made like a channel extending along the longitudinal axis 2a.

The second guide 261 is, on the other hand, preferably designed to loosely accommodate at least part of the control means 4. In particular, the second guide 261 is preferably skewed in relation to the first guide 260 given that the control means 4 are configured to interfere, at least in part, with the shutter 3.

The casing 2 may comprise, therefore, a stopper 27 as well.

The stopper 27 may consist of one piece with the central body 26. However, the stopper 27 is preferably removable or extractable so as to enable, if necessary, the dismantling of the coupling 1.

The stopper 27 is, preferably, therefore, removably attached to the central body 26 at the inlet 25. The stopper 27, therefore, can itself form at least part of the inlet 25.

The stopper 27, in addition, preferably also defines part of the first guide 260. The stopper 27 contributes, in fact, to defining the stroke for the shutter 3 along the longitudinal axis 2a. Even more specifically, it is designed to define the stroke to limit the stroke of the shutter 3 along the main axis 2a.

The stopper 27 thus prevents the shutter 3 from escaping the coupling 1.

The main connector 6, as already mentioned, is attached at the outlet 20 so as to be in fluidic through connection with the external connector 10 by means of the shutter 3.

In addition, specifically, it comprises a spool 60.

The spool 60 is preferably included in the main connector 6; in any case, it could be included inside the central body 26 itself. This latter case is preferable if, for example, the coupling 1 requires a removable main connector 6.

In any case, the spool is preferably mobile along the main axis 2a. For example, it can be moved within part of the main connector 6 or within the first guide 260 and according to the embodiment of the coupling 1.

The spool 60 preferably defines at least one closed position wherein it stops fluid from passing from the outlet 20 and an open position wherein it enables fluid to pass from the outlet 20.

In particular, this second position is preferably reached when the external connector 10 is inserted inside the casing 2. Even more specifically, as a consequence of the insertion of the external connector 10, the shutter 3 moves along the longitudinal axis 2a and pushes the spool 60 from the closed position to the open position.

In order to ensure a hermetic closure, the spool 60 can be made like a slider or little stopper that moves along the longitudinal axis 2a as a result of mechanical or pneumatic thrusts. The opening preferably occurs as a result of mechanical thrust, thanks to the shutter 3, while the closure occurs as a result of pneumatic thrust following the withdrawal or retraction of the shutter 3.

Therefore, the spool 60 preferably includes a gasket that is designed to seal the outlet 20. A gasket of this type can be made by means of a simple O-ring.

The shutter 3, as partially already described, is preferably housed within the casing 2 so as to be able to translate along the longitudinal axis 2a.

More specifically, the shutter 3 preferably does not move freely, but moves in opposition to the first opposing means 21.

The first opposing means 21 are, preferably, designed to exert an elastic thrust on the shutter 3 so as to force the same to pass from a position of stress to a position of release. The shutter 3 is, preferably, in the part or discharge position when it is in contact with the stopper 27, i.e. when it is withdrawn from the outlet 20. In contrast, the first opposing means 21 exert their thrust on the shutter 3 when the latter is drawn near the outlet 20 or when the shutter 3 pushes the spool 60 into the open position.

The shutter 3 is, preferably, designed to house at least part of the external connector 10. Therefore, the latter is connected to the casing 2 by means of the shutter 3.

The external connector 10 is, in particular, designed to be inserted inside the shutter 3.

The shutter 3, therefore, defines at least one housing for the external connector 10 and the retaining means 30.

The retaining means 30 are preferably configured to lock at least part of the external connector 10 within the shutter 3. In particular, the retaining means 30 lock the external connector 10 at least in one position, along the longitudinal axis 2a, defined by the shutter 3.

Specifically, the retaining means 30 preferably restrain the external connector 10 at least when the shutter 3 is brought near the outlet 20. More suitably, the retaining means 30 restrain the external connector 10 in a plurality of positions and release the external connector 10 when the shutter 3 is in the furthest withdrawn position, for example, when it abuts against the stopper 27.

The retaining means 30 can be of various kinds. In the preferred embodiment, they comprise at least one retaining device 30a and a seat 30b.

The retaining device 30a is designed to interact with part of the external connector 10 in order to lock it. In addition, the retaining device 30a is preferably designed to interact with part of the casing 2.

To this end, the casing 2 includes at least one obstacle 28.

The obstacle 28 can be a shoulder or a section narrowing inside the casing 2 and, in particular, of the first guide 260.

In any case, the obstacle 28 is preferably designed to interfere with part of the shutter 3 during its stroke and, specifically, with the retaining means 30.

The obstacle 28 is preferably arranged near the inlet 25. In this way, when the shutter 3 draws near the outlet, the retaining means 30 immediately transit to the obstacle 28.

The retaining device 30a is preferably a mobile element arranged inside the seat 30b. Even more specifically, the retaining device 30a is configured to interfere with the obstacle 28 when the shutter 3 draws near the outlet 20. The retaining device 30a can preferably, therefore, be a sphere.

The seat 30b is preferably designed to guide the retaining device 30a along a restricted path that is skewed in relation to the longitudinal axis 2a in such a way as to enable the locking of the external connector 10 in at least one position.

Basically, therefore, the retaining device 30a can be a slider that moves away from and draws near the longitudinal axis 2a, or can be an element designed to expand or radially retract in relation to the longitudinal axis 2a.

The control means 4 are preferably designed to control, at least in part, the shutter 3.

The control means 4 are preferably accessible from the outside. In addition, they include at least one first slider 40.

The first slider 40 is preferably housed inside the casing 2 so as to be able to translate along a locking direction 4a.

The locking direction 4a is preferably a direction that is skewed in relation to the longitudinal axis 2a. It may, for example, be perpendicular to the longitudinal axis 2a.

The first slider 40 may be a button. The user can, therefore, press the first slider 40 to move it along the locking direction 4a.

In addition, the first slider 40 is configured to house at least part of the shutter 3. To this end, the first slider 40 preferably includes a through hole inside of which the shutter 3 is inserted and translated.

The first slider 40 is preferably designed to move along the locking direction 4a in opposition to the second opposing means 22.

The second opposing means 22 can be similar to the first opposing means 21. In any case, the second opposing means 22 preferably include at least one elastic element able to counteract the movement of the first slider 40 defining, therefore, at least one rest position and one of greater stress.

The second opposing means 22 preferably oppose the approach of the first slider 40 to the longitudinal axis 2a. In other words, since the first slider 40 is preferably an annular element, the second opposing means 22 oppose the centering of the first slider 40 in relation to the longitudinal axis 2a.

When the second opposing means 22 are at rest, therefore, the first slider 40 preferably interferes with the shutter 3. In contrast, when the second opposing means 22 are more stressed, the first slider 40 detaches the shutter 3.

The attachment between the first slider 40 and the shutter 3 is preferably made by locking means 41.

The locking means 41 are preferably configured to lock the shutter in the first slider 40 in at least one position along the locking direction 4a.

In particular, the locking means 41 preferably lock the shutter 3 when the first slider 40 is in the maximum decentring position in relation to the longitudinal axis 2a, or when the second opposing means 22 are at rest.

Even more specifically, the locking of the shutter 3 occurs when the latter is brought near the outlet 20. In order to force the interaction between the first slider 40 and the shutter 3, the shutter 3 preferably includes a second element 32.

The second element 32 is preferably an element protruding in a skewed manner in relation to the longitudinal axis 2a.

In addition, it is preferably arranged between the ends of the shutter 3, for example in a middle position in relation to the ends of the shutter 3 along the longitudinal axis 2a.

The locking means 41 are, therefore, configured to interfere with the second element 32 when the control means 4 lock the shutter 3. From a structural point of view, the locking means 41 and the second element 32 can be protuberances, for example, portions that radially extend.

For example, the locking means 41 can be a protuberance inside the hole of the first slider 40 extending towards the longitudinal axis 2a. The second element 32 can be, for example, a protuberance extending, beginning from the shutter 3, away from the longitudinal axis 2a.

In any case, the parts of the coupling 1 described above are well known to the person skilled in the art, even if the description dwells, for the sake of completeness, on details.

In contrast to the prior art, in any case, it is important to mention that the locking means 41 may extend along the locking direction 4a beginning exclusively from just one position along the longitudinal axis 2a.

Normally, in fact, the first slider 40 has at least two interfering portions separated along the longitudinal axis, while, in this embodiment, there do not need to be at least two portions. It is sufficient for the locking means 41 to include just one protuberance.

In addition, the coupling 1 advantageously includes safety means 5.

The safety means 5 are preferably configured to lock the shutter 3 when subject to pressures above a predetermined threshold value.

In particular, the pressure is exerted as a result of the fluid present inside the coupling 1.

Basically, therefore, the safety means 5 take advantage of the pressure of the fluid to lock the shutter 3. It is, moreover, important to highlight the fact that the shutter 3 locks the external connector 10 at least when the safety means 5 lock the shutter 3.

This last aspect, is, in fact, decisive for, for example, simplifying the design of the first slider 40.

Specifically, the pressure threshold value can be determined using various systems. A system with pressure sensors and an electronic actuator can be provided, or a hydraulic valve system, or another kind of system.

The safety means 5 preferably operate in opposition to third opposing means 23.

The third opposing means 23 are preferably, just like the first and second opposing means 21, 22, elastic elements designed to exert a springback force on the safety means 5.

Therefore, the predetermined threshold value is basically determined by the opposing force created by the third opposing means 23.

In practice, it is possible to control the locking pressure of the safety means 5 by choosing opposing means that ensure thrusts of different entities.

For example, if the third opposing means 23 consist of a spring, it is possible to change the threshold value proportionally to the stiffness of the spring.

The safety means 5 can, thus, take advantage of the opposing means 23 in various ways. Preferably, in the preferred embodiment, the safety means 5 comprise at least one second slider 50 and a constraint device 51.

The second slider 50 is preferably housed within the casing 2 so as to be able to translate at least along the longitudinal axis 2a. Of course, the second slider 50 could translate along a skewed direction, preferably not a perpendicular one.

In particular, moreover, the second slider 50 can preferably translate in opposition to the third opposing means 23.

The second constraint device 51 is preferably the part of the safety means 5 designed to interfere directly with the shutter 3.

The constraint device 51 can preferably be moved by means of the second slider 50 along a constraint direction 5a.

The latter, like the locking direction 4a is preferably skewed in relation to the longitudinal axis 2a.

Moving along the constraint direction 5a, the constraint device 51 is preferably designed to interfere with the shutter 30, in particular in at least one position along the constraint direction 5a.

The second slider 50 and the constraint device 51 may, therefore, consist of one piece.

Or they may be separate elements.

In the preferred embodiment, the second slider 50 and the constraint device 51 are distinct elements. In addition, the casing 2 preferably includes a guide 24.

The guide 24 is preferably designed to house at least part of the constraint device 51. In addition, it is configured to determine a restricted path for the constraint device 51.

In this way, the constraint device 51 is designed to move within the guide 24 along the constraint direction 5a.

The guide 24 is preferably arranged near the outlet 20 so that the shutter 3 can be locked, preferably, by the safety means 5 when it is in the more advanced position, or near the outlet 20.

The second slider 50 can, therefore, include an annular element centred in relation to the longitudinal axis 2a. In addition, it can define a movement surface 50a.

The movement surface 50a can be a skewed surface in relation to the longitudinal axis 2a and designed to interfere with the constraint device 51. In particular, the second slider 50 transmits the thrust to the constraint device 51 by means of the movement surface 50a.

The constraint device 51 can be a spherical element designed to be thrust from the movement surface 50a along the constraint direction 5a by rotating within the guide 24.

The shutter 3 can, thus, in turn, include an element interfering with the constraint device 51. Preferably, the shutter 3 includes a first element 31.

The first element 31 preferably protrudes in a skewed manner in relation to the longitudinal axis 2a. In addition, it is arranged at the end of the shutter 3 near the outlet 20.

The constraint device 51 is, thus, preferably configured to interfere with the first element 31 when the safety means lock the shutter 3.

The fluid can exert its pressure on the safety means 5 thanks to the fluidic through connection between the casing 2, in particular the first guide 260, and the second slider 50.

In particular, this connection can be made with at least one duct 52.

The duct 52 can be a hole made radially in relation to the longitudinal axis 2a so as to put the second slider 50 in fluidic through connection with the casing 2.

In addition, still more specifically, the duct 52 can be arranged along the longitudinal axis 2a between the shutter and the spool 60.

The spool 60 can also be designed to open or close the duct 52. In general, the spool enables fluid to pass from the outlet 20 when the safety means 5 lock the shutter 3. In addition, in the preferred embodiment, they also enable fluid to pass between the casing 2 and the safety means 5.

However, it can be arranged that, when the shutter 3 withdraws to constrain the external connector 10, the spool 60 advances along the longitudinal axis 2a towards the inlet 25 so as to seal the outlet 20, but also the duct 52. In any case, the spool 60 preferably enables, even when advanced, fluid to pass through the outlet 20 and duct 52.

In any case, the safety means 5 can prevent the constraint between the shutter 3 and the external connector 10 if the coupling 1 is subjected to a pressure that exceeds the predetermined threshold values by means of residual fluid included there.

The operation of the improved quick coupling 1 previously described in structural terms is basically similar to any quick coupling in the prior art.

The user can, thus, connect the coupling 1 with an external connector 10 and release the external connector 10.

During the disconnecting step, the pressure of the button, or the activation of the control means 4, releases the first slider from the shutter 3; in any case, the shutter 3 does not immediately withdraw since the residual fluid inside the casing 2 keeps the safety means 5 under pressure and the constraint device 51 locks the shutter 3 by means of the first element 30. However, when the pressure inside the casing 2 lessens, thanks to the dispersion of fluid towards the outside, the shutter 3 is released by the constraint means 5 and withdraws due to the first opposing means 21. Once it has withdrawn, when the shutter 3 abuts against the stopper 27, the retaining means 30 release the external connector 10.

The improved quick coupling 1 according to the invention entails, therefore, significant advantages.

In fact, the structure of the safety means 5 that constrain the shutter 3 while the shutter 3 constrains, at the same time, the external connector 10, avoid the use of control means 4 with particular internal structures that are difficult to machine.

In this sense, the structure of the first slider 40 and of the locking means 41 is significantly simplified, with consequent advantages in terms of the speed and cost of machining.

Offset grooves inside the hole of the button are no longer necessary.

In addition, unlocking the external connector 10 is basically automatic, thanks to the safety means 5 and, therefore, the control means 4 are subjected to less force and less wear since their operation is exclusively that of locking the shutter 3 by means of the second element 32 to avoid the springback caused by the first opposing means 21.

The effectiveness of the coupling 1 is much greater and, because of this, there is an increase in safety owing to the fact that the possibility of mechanical breakings defined by the safety means 5 are greatly reduced.

Variations may be made to the invention that fall within the scope of the inventive concept defined in the claims.

For example, the safety means could be arranged in an intermediate position in the casing 2, or not near the outlet 20, and the duct 52 could also extend to part of the shutter 3, as shown, for example, in the alternative embodiment in FIGS. 5-6, so that the inside of the shutter is put in fluidic through connection with the first slider 50.

In this context, all details can be replaced by equivalent elements, and the materials, shapes, and dimensions may be any materials, shapes, and dimensions.

The invention claimed is:

1. An improved quick coupling comprising:
a casing defining a longitudinal axis, an outlet and an inlet, and configured to receive at said inlet at least part of an external connector so as to put said external connector and said outlet in fluidic through connection with each other,
a shutter housed within said casing so that it can translate along said longitudinal axis in opposition to first opposing means, configured to house at least part of said external connector and including retaining means configured to lock at least part of said external connector within said shutter in at least one position along said longitudinal axis,
control means accessible from the outside and including at least one first slider housed within said casing so that it can translate along a locking direction skewed with respect to said longitudinal axis in opposition to second opposing means, configured to house at least part of said shutter and including locking means configured to lock said shutter within said first slider in at least one position along said locking direction,
safety means configured to lock said shutter when subjected to pressures higher than a predetermined threshold value caused by a fluid present within said coupling,
said shutter locking said external connector at least when said safety means lock said shutter,
wherein said safety means operate in opposition to third opposing means and said predetermined threshold value is determined by the opposing force exerted by said third opposing means and
wherein said safety means comprise at least one second slider housed within said casing so that it can at least translate along said longitudinal axis in opposition to said third opposing means, and at least one constraint device movable by means of said second slider along a constraint direction skewed with respect to said longitudinal axis and configured to interfere with said shutter in at least one position along said constraint direction.

2. The coupling according to claim 1, wherein said casing includes at least one guide configured to house at least part of said constraint device and configured to determine a restricted path for said constraint device, said constraint device being separate from said slider and configured to move along said constraint direction within said guide.

3. The coupling according to claim 2, wherein said second slider includes an annular element centered with respect to said longitudinal axis and defining a movement surface skewed with respect to said longitudinal axis, and said constraint device is a spherical element configured to be pushed by said movement surface along said constraint direction within said guide.

4. The coupling according to claim 1, wherein said second slider includes an annular element centered with respect to said longitudinal axis and defining a movement surface skewed with respect to said longitudinal axis, and said constraint device is a spherical element configured to be pushed by said movement surface along said constraint direction within said guide.

5. The coupling according to claim 1, wherein said shutter includes at least one first element protruding in a skewed manner with respect to said longitudinal axis and arranged at the end of said shutter close to said outlet, and said constraint device is configured to interfere with said first element when said safety means lock said shutter.

6. The coupling according to claim 1, wherein said shutter includes at least one second element protruding in a skewed manner with respect to said longitudinal axis and arranged between the ends of said shutter, and said locking means are configured to interfere with said second element when said control means lock said shutter.

7. The coupling according to claim 1, wherein said casing includes at least one obstacle arranged in proximity to said inlet and protruding in a skewed manner with respect to said longitudinal axis, and said retaining means include at least one retaining device configured to interfere with said obstacle and a seat configured to guide said retaining device along a restricted path skewed with respect to said longitudinal axis so as to allow the locking of said external connector in at least one position.

8. The coupling according to claim 1, comprising a main connector constrained at said outlet so as to be in fluidic through connection with said external connector through said shutter and comprising a spool movable along said main axis and defining a closed position, in which said spool blocks the passage of said fluid through said outlet, and an open position, in which said spool allows the passage of said fluid through said outlet, occurring at least when said safety means lock said shutter.

9. The coupling according to claim 1, wherein said casing comprises a central body defining a first guide configured to loosely accommodate said shutter so that it can move along said main axis, and a second guide suitable to loosely accommodate said first slider so that it can move along said locking direction, and a stopper removably constrained to said central body at said inlet, defining part of said first guide and configured to limit the stroke of said shutter along said longitudinal axis.

* * * * *